United States Patent
Bhalgat et al.

(10) Patent No.: US 7,548,615 B2
(45) Date of Patent: Jun. 16, 2009

(54) RATE VALIDATION SYSTEM AND METHOD

(75) Inventors: Jitendra K Bhalgat, Marlton, NJ (US);
Carly Ann Allen, West Sussex (GB);
Deborah C. Fearon, Chandler, AZ (US);
Clare Solly, West Sussex (GB)

(73) Assignee: American Express Travel Related Services Company, Inc., New York, NY (US)

( * ) Notice: Subject to any disclaimer, the term of this patent is extended or adjusted under 35 U.S.C. 154(b) by 783 days.

(21) Appl. No.: 10/711,609

(22) Filed: Sep. 28, 2004

(65) Prior Publication Data

US 2005/0246183 A1 Nov. 3, 2005

Related U.S. Application Data

(60) Provisional application No. 60/521,454, filed on Apr. 28, 2004.

(51) Int. Cl.
*H04M 15/00* (2006.01)
(52) U.S. Cl. .......................... 379/114.14; 705/1; 707/3; 707/8
(58) Field of Classification Search .................... 705/1, 705/5–6, 14–16, 18, 20, 22, 24, 28, 37, 40; 379/114.14; 707/3, 8
See application file for complete search history.

(56) References Cited

U.S. PATENT DOCUMENTS

| | | | |
|---|---|---|---|
| 5,331,546 A | 7/1994 | Webber et al. | |
| 5,404,291 A | 4/1995 | Kerr et al. | |
| 5,570,283 A | 10/1996 | Shoolery et al. | |
| 5,648,900 A | 7/1997 | Bowen et al. | |
| 5,652,867 A | 7/1997 | Barlow et al. | |
| 5,764,981 A | 6/1998 | Brice et al. | |
| 5,832,451 A * | 11/1998 | Flake et al. | 705/5 |
| 5,832,452 A | 11/1998 | Schneider et al. | |
| 5,832,453 A | 11/1998 | OBrien | |
| 5,864,818 A | 1/1999 | Feldman | |
| 6,023,679 A | 2/2000 | Acebo et al. | |
| 6,085,164 A | 7/2000 | Smith et al. | |
| 6,119,094 A | 9/2000 | Lynch et al. | |
| 6,122,642 A | 9/2000 | Mehovic | |
| 6,229,534 B1 | 5/2001 | Gerra et al. | |
| 6,275,808 B1 | 8/2001 | DeMarcken | |
| 6,442,526 B1 | 8/2002 | Vance et al. | |

(Continued)

*Primary Examiner*—Binh K Tieu
(74) *Attorney, Agent, or Firm*—Fitzpatrick, Cella, Harper & Scinto

(57) ABSTRACT

The present invention facilitates automated audits for systems storing travel services rates based on special or negotiated pricing structures. The invention provides a system and method by which a customer and/or broker of travel related services may invoke an audit against one or more global distribution systems which are commonly used by travel services providers to maintain rate and discount information specific to customers and/or brokers. In cases where a customer and/or broker has negotiated or arranged for a special discounted rate for travel services, it is the responsibility of the travel services provider to enter the rate or discount information into one or more global distribution systems. An audit is intended to examine rates stored within one or more global distribution systems and flag missing or inaccurate entries. Based on an audit report, customers and/or brokers may notify the service provider(s) and inform them of the discrepancies in order that they may perform the required corrections.

16 Claims, 4 Drawing Sheets

U.S. PATENT DOCUMENTS

| | | |
|---|---|---|
| 6,609,098 B1 | 8/2003 | DeMarcken |
| 6,625,598 B1 * | 9/2003 | Kraffert ........................ 707/3 |
| 6,782,388 B2 * | 8/2004 | Majewski et al. ............ 707/10 |
| 2001/0034625 A1 | 10/2001 | Kwoh |
| 2001/0037250 A1 | 11/2001 | Lefkowitz |
| 2002/0188516 A1 | 12/2002 | Farrow et al. |
| 2003/0036918 A1 * | 2/2003 | Pintsov ........................ 705/1 |
| 2003/0050865 A1 | 3/2003 | Dutta et al. |
| 2003/0061145 A1 | 3/2003 | Norrid |
| 2003/0065591 A1 | 4/2003 | Jones |
| 2003/0065592 A1 | 4/2003 | Jones |
| 2003/0088472 A1 | 5/2003 | Offutt et al. |
| 2003/0097274 A1 | 5/2003 | Parsons |
| 2003/0110063 A1 | 6/2003 | Among et al. |
| 2003/0120523 A1 | 6/2003 | Jafri et al. |
| 2003/0125994 A1 | 7/2003 | Jachn et al. |
| 2003/0139996 A1 | 7/2003 | DAntoni et al. |
| 2003/0187705 A1 * | 10/2003 | Schiff et al. .................... 705/5 |
| 2003/0191725 A1 | 10/2003 | Ratliff et al. |
| 2003/0236722 A1 | 12/2003 | Kamel |
| 2004/0049429 A1 | 3/2004 | Al Sayari |
| 2004/0049446 A1 * | 3/2004 | Seljeseth ...................... 705/37 |
| 2004/0070603 A1 | 4/2004 | Gerra et al. |
| 2004/0153382 A1 * | 8/2004 | Boccuzzi et al. .............. 705/34 |
| 2005/0008001 A1 * | 1/2005 | Williams et al. ............ 370/352 |
| 2005/0010819 A1 * | 1/2005 | Williams et al. ............ 713/201 |
| 2005/0015622 A1 * | 1/2005 | Williams et al. ............ 713/201 |
| 2005/0015623 A1 * | 1/2005 | Williams et al. ............ 713/201 |
| 2005/0257267 A1 * | 11/2005 | Williams et al. .............. 726/25 |
| 2007/0043636 A1 * | 2/2007 | Foster ........................ 705/31 |

* cited by examiner

RATE VALIDATION SYSTEM AND METHOD

CROSS-REFERENCE TO RELATED APPLICATIONS

This application claims priority to, and the benefit of, U.S. Provisional Application Ser. No. 60/521,454 filed Apr. 28, 2004 and entitled "Hotel Rate Validation System and Method", which is hereby incorporated by reference.

FIELD OF INVENTION

The present invention generally relates to validation of negotiated discount rates which have been entered into an information system by a participating product and services providers. More particularly, the invention relates to a system and method for confirming that negotiated discount rates have been entered correctly and loaded into a database within an inventory distribution system, thereby reducing occurrences of customer overpayment for such services.

BACKGROUND OF INVENTION

The travel and lodging industry has long relied on travel agents to direct consumers to their services. The Internet has changed the travel industry by providing a direct channel between the travel services provider and consumer. However, travel agents are still utilized in large part by the corporate travelers and those preferring the services of a professional travel agent to ensure that their vacation or business travel is planed thoroughly and that they are receiving the lowest possible rates.

There are a number of inventory management and distribution systems (IMDS) which have been generally adopted by the various products and services industries as standards for providing rate negotiation and distribution services to participating customers. In the travel industry, for instance, there exist four primary computer based travel IMDS', namely, Sabre, Galileo, Amadeus and Worldspan. While variations exist between the four major IMDS systems used within the travel industry, the underlying concept is generally the same in that a IMDS provides travel agents (known herein as brokers), corporate travel clients, and in some cases, individual customers with direct access to travel service provider rates and booking tools.

In general, a IMDS (or related system) provides brokers information to help negotiate discounts on behalf of their customers and with travel service providers with whom they would like to conduct business. A IMDS provides a travel service provider a means to attract repeat business from clients in return for a discounted rate. When a rate is negotiated, it is the responsibility of the travel service provider to enter the rate data into the IMDS. Due to human error as well as possible computer errors, rate data is often not entered correctly or is not properly recorded within the IMDS itself. As a result, customers may not receive benefit from negotiated discount rates.

One solution to ensuring that rate data has been entered and recorded correctly would be to manually audit a IMDS for inaccuracies. However, this can be a very time-consuming and expensive task, as there may be many hundreds or thousands of database records to examine. Therefore, a need exists for a system and method for facilitating a computerized scan of a IMDS database in order to flag suspicious and/or missing rate data.

SUMMARY OF INVENTION

The present invention overcomes the limitations and problems of the prior art by providing a system and method for identifying inaccurate or missing rate entries from within an IMDS (e.g. GDS, CRS, utility database, public transportation database, merchant database, supplier database). The system may employ pre-defined parameters to facilitate an automated scan process of rate related content which has been entered by a product or service provider and stored within an inventory management system database. Suspect or missing data identified through the scan process may be flagged to provide a fast and efficient means to correct inaccuracies and confirm that customers receive contractually negotiate rates.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention.

Further, while the detailed description makes frequent reference to the invention as it may be employed in the travel services industry, practitioners will appreciate that the invention may be equally applicable within any number of industries where products and services are exchanged for monetary value. For example, a grocery chain may utilize the invention to maintain, audit and enforce negotiated rates with their suppliers where rates for wholesale products are negotiated and maintained within an inventory management system of the supplier. Likewise, the invention may be applicable within the utilities industry. Large industrial consumers of utilities services such as, for example, farming, industrial, and other utility companies may employ the invention to maintain, audit and enforce negotiated rates for electrical, water and telephone services. Thus, the detailed description herein is presented for purposes of illustration only and does not limit the scope of the present invention.

Figure 1:
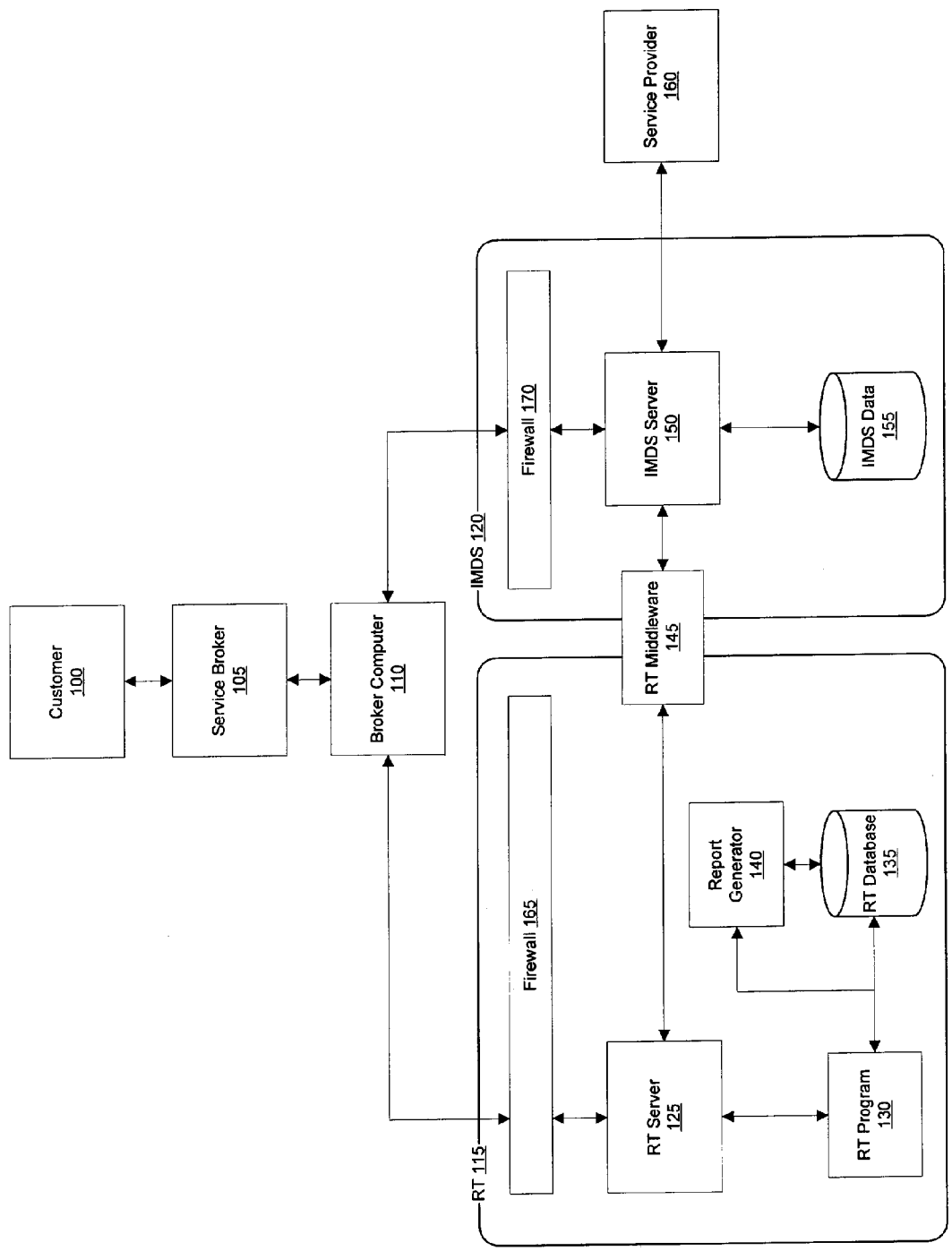
FIG. 1 is a block diagram illustrating an exemplary system of the present invention.

In general, the invention includes a system and method for substantially confirming that negotiated service rates are properly recorded within an inventory management system through facilitation of automated rate audits. As used herein, a rate may comprise anything of value and may include, for example, price, cost, fare, fee, and the like. With reference to FIG. 1, the invention may enable a service broker 105 (e.g., travel agent) to initiate an audit of negotiated service rates to substantially ensure that service broker's 105 customers 100 are afforded the proper negotiated service rates at the time of purchase. Service broker 105 may interact with the various systems of the rate tracking (RT) 115 system and one or more IMDS 120 through any means known in the art. In one embodiment, RT 115 may include one or more RT server 125, RT program 130, RT database 135, reporting engine 140 and RT middleware 145. IMDS 120 may include one or more IMDS server 150 and IMDS database 155. Practitioners will appreciate that the architecture and functionality of a IMDS 120, as illustrated and described herein, is used to explain the interaction between the invention and a IMDS 120. The utility of a IMDS 120 may be implemented through any number of known systems for distribution servicing.

As will be appreciated by one of ordinary skill in the art, the present invention may be embodied as a customization of an existing system, an addon product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

A travel service, as used herein, may include lodging, transportation, dining, entertainment, guided tours, vacation packages and/or the like. The travel service may have a value, but a value is not required. The travel service may be provided to a customer either directly or indirectly. The travel service may be associated with services, goods or items of monetary value. For example, a travel service may comprise a vacation package along with 100,000 frequent flyer miles.

A customer 100, as used herein, may include any individual, business, entity, government organization, software and/or hardware suitably configured to purchase travel services. A customer 100 may purchase travel services through a travel service broker 105 or interact directly or indirectly with a service provider 160 to purchase travel services. A customer 100 may also be a service broker 105 who purchases travel services from a service provider 160 or another service broker 105 and re-sales the services to other customers 100. A customer 100 may interface with a service broker 105 via any communication protocol, device or method discussed herein or known in the art.

A travel services broker 105, or broker as used herein, may include any individual, business, entity, government organization, software and/or hardware that serves as a liaison between a customer 100 and a service provider 160 in order to negotiate an exchange for products and/or services for a value. A services broker 105 may interact with a customer 100 either directly or indirectly to identify and/or purchase travel services from one or more service providers 110. A broker 105 may include any travel agent such as, for example, American Express Business Travel®, Carlson Wagonlit Travel®, Expedia®, etc. Interaction between a services broker 105, a customer 100 and service provider 110 may be conducted through any communications means known in the art or discussed herein, including in-person, telephone, electronic data transfer, etc. In one embodiment, a services broker 105 may also be a service provider 160.

A broker computer 110 may include any software and/or hardware that facilitates communication and/or transaction between service broker 105, RT system 115 and IMDS 120. Broker computer 110 may interface with a RT system and/or IMDS 120 via any communication protocol, device or method discussed herein or known in the art. In one embodiment, a broker computer 110 may interface with an RT system 115 and/or IMDS 120 via an Internet browser. An Internet browser may comprise any hardware and/or software suitably configured to facilitate input, receipt and/or review of any information related to an RT system 115, IMDS 120 or any information discussed herein. An Internet browser may include any device (e.g., personal computer) which communicates (in any manner discussed herein) with an RT system 115 and/or IMDS 120 via any network discussed herein. Such Internet browsers comprise software installed within a computing unit or system to conduct online transactions and communications. These computing units or systems may take the form of a computer or set of computers, although other types of computing units or systems may be used, including laptops, notebooks, hand held devices, set-top boxes, workstations, computer-servers, main frame computers, mini-computers, PC servers, pervasive computers, network sets of computers, and/or the like.

Practitioners will appreciate that brokers 105 and service providers 160 may or may not interact with the system components through a browser application, but through a host terminal or the server directly. The systems may also include access rights and varying levels of access to different portions of the systems for different entities. Further, broker computer 110 may interact with the various system components of the invention through any communications protocols and architectures known in the art or as discussed herein.

A travel services provider 160, or provider as may be used herein, may include any individual, business, entity, government organization, software and/or hardware that provides travel related services to customers 100. Travel related services may comprise any service that may be associated with business or pleasure travel such as, for example, hotels, resorts, airlines, cruise lines, car rentals, restaurants, amusement parks, museums, tours, theaters and the like. Travel services may also include any other goods or services, even if unrelated to traditional travel. In one embodiment, a service provider 160 may also be a service broker 105 wherein services are marketed and/or negotiated and sold by the service provider 160 directly. Further, it should be understood that the present invention is not limited to travel service providers. As previously described, the travel services provider 160, may be substituted with any known provider of services and/or products.

Firewall 165 may include any hardware and/or software suitably configured to protect RT system 115 components from users from other networks and provide limited or restricted access to broker computers 110. Firewall 165 may reside in varying configurations including Stateful Inspection, Proxy based and Packet Filtering among others. Firewall 165 may be integrated within an RT server 125, other system components or may reside as a stand-alone component.

RT server 125 may include any hardware and/or software suitably configured to process transactions, manage processes and facilitate communications between external entities and components within an RT system 115. RT server 125 may interface directly or indirectly with broker computer 110, RT program 130, RT database 135, reporting engine 140 and RT middleware 145. RT server 125 may be implemented as a single computing unit in a single geographic location or may comprise any number computing units and/or components located together or residing in separate geographic locations. RT server 125 may be an Internet server configured to receive, process and send HTML streams. Further, RT server 125 may exist as one or more servers, mainframes or any other computing device configured to send and receive data between itself and one or more Internet servers, workstations, personal computers and the like.

In one embodiment, an RT server 115 may be configured to dispatch requests to components behind a firewall in order to prevent direct access to the RT system components. Data transmissions between a broker computer 110 and the components of an RT system 115 may be first processed by an RT server 125. An RT server may invoke an RT program 130 to process data, request data or commit data to an RT database 135. Further, RT server 125 may invoke an RT program 130 to construct a report using a reports engine 140. Reports engine 140 may request data from RT database 135 to compile pre-configured and/or ad-hoc reports.

For simplicity, RT server 125, RT program 130, RT database 135, reporting engine 140, and middleware 145 are illustrated and described herein as individual components within an RT system 115. Practitioners will appreciate that the various system components of an RT system 115 may reside within memory structures of an RT server 125 or may comprise any number of computing systems and architectures.

RT database 135 may include any hardware and/or software suitably configured to facilitate storing service data and/or audit data relating to customer 100, service broker 105 and service provider 160. Service data may comprise any information which may be used to identify a customer, service broker, service provider, negotiated rates and the like. Audit data may comprise any information relating to the verification of records, missing records, statistics, and/or inaccuracies found within one of more IMDS 120 during an audit. For simplicity, RT database 135 is illustrated and described herein as a single database. One skilled in the art will appreciate that an RT system 115 may employ any number of databases in any number of configurations. Further, as described in detail below, an RT database 135 may be any type of database, such as relational, hierarchical, object-oriented, and/or the like.

Report generator 140 may include any hardware and/or software suitably configured to produce reports from information stored in one or more databases. Report generators are commercially available and known in the art. Report generator 140 may provide printed reports, web access to reports, graphs, real-time information, raw data, batch information and/or the like. A report generator 140 may be implemented through commercially available hardware and/or software, through custom hardware and/or software components, or through a combination thereof. Further, report generator 140 may reside as a standalone system within an RT system 115 or may be a software component installed in an RT server 125. Report generator 140 may be configured to process requests from RT program 130 based on IMDS 120 audit results. Data extracted from an RT database 135 may be formatted by a report generator 140 and transmitted from an RT server 125 to broker computer 110.

As illustrated and discussed herein, a report generator 140 may process and format data relating to one or more IMDS 120 audits in a manner to be received by a broker computer 110. However, practitioners will appreciate that a report generator 140 may also produce any number of pre-configured and/or ad-hoc reports which may be transmitted directly or indirectly to a broker computer 110, customer 100, service provider 160 or any other entity.

RT middleware 145 may include any hardware and/or software suitably configured to facilitate communications and/or process transactions between disparate computing systems. Middleware components are commercially available and known in the art. RT middleware 145 may be implemented through commercially available hardware and/or software, through custom hardware and/or software components, or through a combination thereof. RT middleware 145 may reside in a variety of configurations and may exist as a standalone system or may be a software component residing within an RT server 125. RT middleware 145 may be configured to process transactions between an RT server 125 and one or more IMDS 120.

Further, RT middleware 145 may contain logic for navigating, extracting data and entering data into various user interface screens and/or webpages. This type of logic most often uses patterns within a user interface and/or webpage to recognize and determine what command or action to execute next. A developer may create and define sequences of such patterns and create corresponding scripts providing instructions on what commands or actions to execute when each defined pattern is recognized. Practitioners will appreciate that there a number of commercially available software tools which facilitate this type of communications between disparate computing systems. Such tools are often referred to as pattern recognition systems or, screen-scrapers as used herein.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, satellite network, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network.

Any databases discussed herein may be any type of database, such as relational, hierarchical, graphical, object-oriented, custom built and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by john Wiley & Sons (second edition, 1996); (2) "Java Cryptography" by jonathan Knudson, published by O'Reilly & Associates (1998); (3) "Cryptography & Network Security: Principles & Practice" by William Stalling, published by Prentice Hall; all of which are hereby incorporated by reference.

Each customer, service broker, and service provider may be equipped with a computing device in order to interact with the system and facilitate online commerce transactions. The customer, service broker, and service provider may each have a computing unit in the form of a personal computer, although other types of computing units may be used including laptops, notebooks, hand held computers, set-top boxes, cellular telephones, touch-tone telephones and the like. However, interaction with the various systems of the invention may conducted through other forms, such as a mini-computer, a PC server, a network of computers located in the same of different geographic locations, or the like. Moreover, the system contemplates the use, sale or distribution of any services or information over any network having similar functionality described herein These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 2:
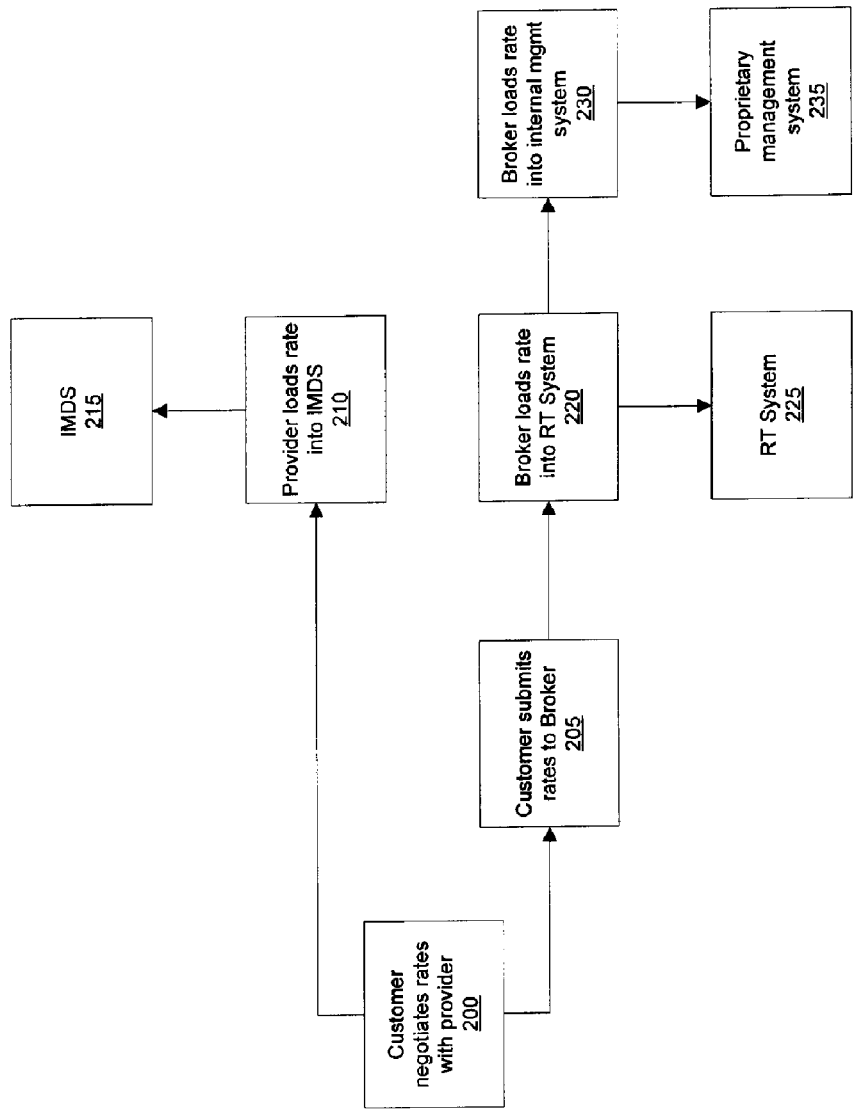
FIG. 2 is a flow chart illustrating an exemplary method for loading negotiated rates into the various systems following a negotiated rate agreement between a broker and a service provider.
Figure 3:
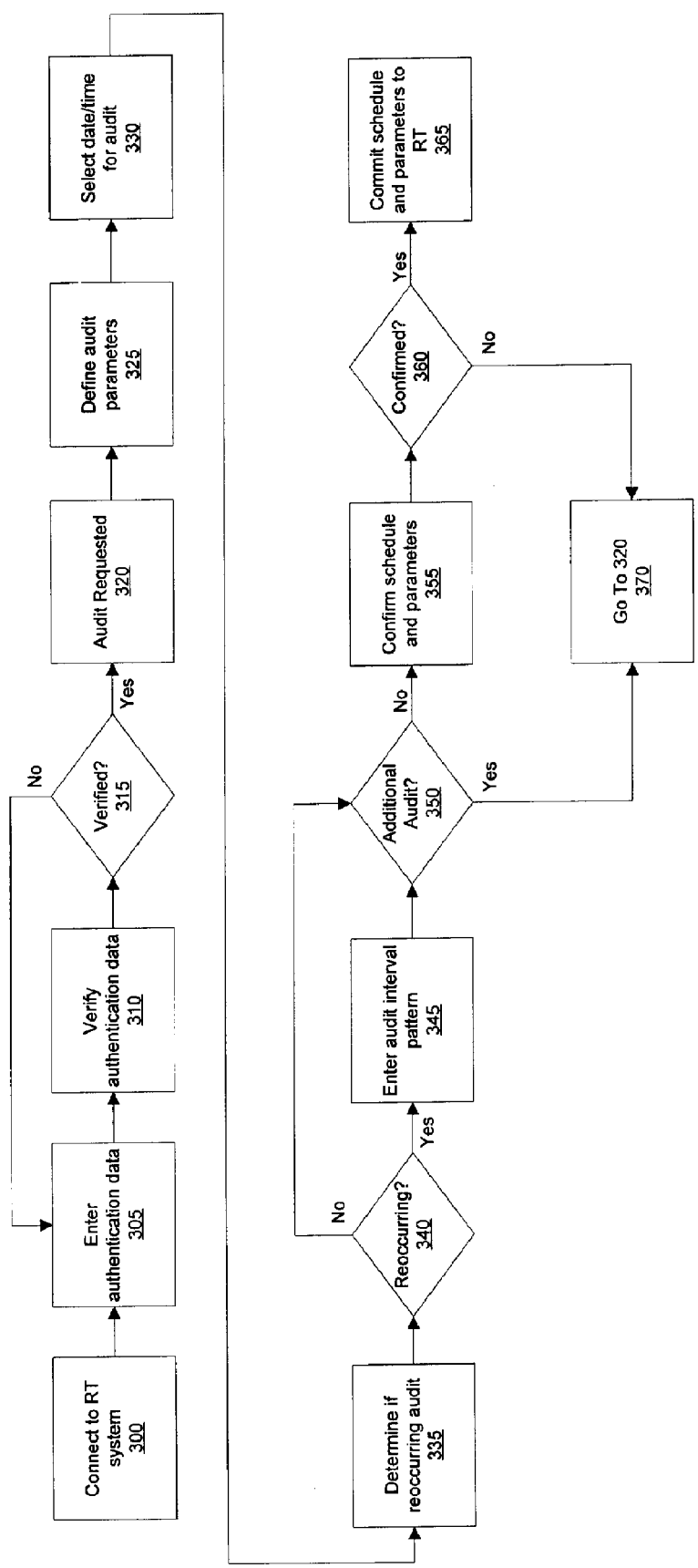
FIG. 3 is a flow chart illustrating an exemplary method for scheduling a rate audit and for configuring audit parameters; and, FIG. 4 is a flow chart illustrating an exemplary method for facilitating an automated audit of negotiated rates within one or more global distribution systems.
Figure 4:
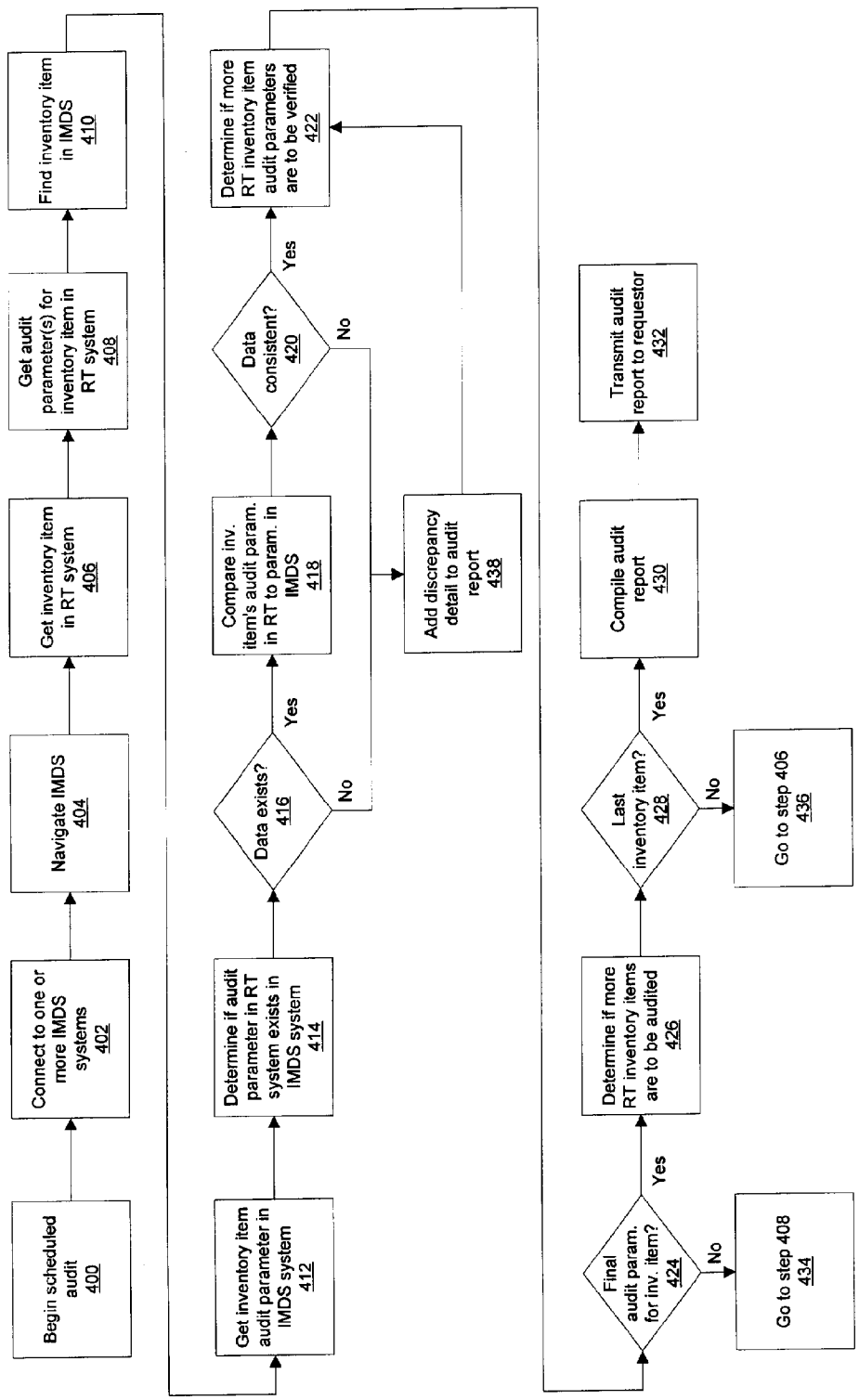

Referring now to FIGS. 2-4, the process flows depicted are merely exemplary embodiments of the invention and are not intended to limit the scope of the invention as described above. For example, the steps recited in any of the method or process descriptions may be executed in any order and are not limited to the order presented. It will be appreciated that the following description makes appropriate references not only to the steps depicted in FIGS. 2-4, but also to the various system components as described above with reference to FIG. 1. Further, illustrations of the process flows and the descriptions thereof may make reference to webpages, websites, web forms, prompts and the like. Practitioners will appreciate that the process steps as illustrated and described below may exist in any number of configurations including the use of API user interface elements, webpages, web forms, popup windows, prompts and the like. It should be further appreciated that the multiple steps as illustrated and described may be combined onto single webpages but have been expanded for the sake of simplicity. In other cases, steps illustrated and described as single process steps may be broken down into multiple webpages or user interface screens but have been combined for simplicity.

FIG. 2 is a flow chart illustrating an exemplary method for loading negotiated rates into the various systems following a negotiated rate agreement between a customer 100 and a provider 160. A rate may also be negotiated between a provider 160 and a broker 105 or another third-party acting in the interest of the customer 100. A negotiated rate may be any rate (e.g., historic, increasing, decreasing, algorithmic, based on certain indices, etc), special rate or discount applying to a customer 100. The rate may have been agreed to by a provider 160 wherein the agreement on the rate may occur through any number of means and may or may not involve direct communication between a provider 160, broker 105 and/or customer 100. By whatever means a special rate is derived and/or agreed to by at least two parties, one party or the other may propose a rate or rate discount to the other. The process may be partially or fully manual or automated.

Practitioners will appreciate that special rates and/or discounts may not always be the subject of a negotiation. For example, a hotel may automatically offer a discount based upon a corporate client's number of employees or travel frequency. However, in either case, a decision may be made by a provider 160 as to whether or not to offer a customer 100 and/or broker 105 a special or discounted rate. Likewise, a decision may be made by a customer 100 and/or broker 105 on whether or not to accept a special rate or discount from a provider 160. As used herein, "rate" should be understood to encompass any defined value in exchange for products and/or services including negotiated rates, price, cost, discounts, fees, promotional rates, seasonal rates, rates including rebates, and the like.

When a rate is accepted by a customer 100 and/or broker 105, a provider 160 may be expected to load the rate into one or more IMDS' (step 210), however this may not always be the case. Negotiated rate data may also be loaded through a backend system of a provider or by any third-party working for or in conjunction with a provider 105. In the travel industry, there are currently several IMDS 120 providers worldwide which serve as industry standards for enabling providers 160 to maintain information relating to their service(s) and rates. A IMDS 120 enables subscribing brokers 105 special access to information as provided by subscribing providers 160 in order to conduct service inquiries, get booking information and make reservations. After a rate has been entered into a IMDS (step 215), it may become available as the rate for the given customer 100 and applicable to all future transactions between a provider 160 and a customer 100. Negotiated rate data may be entered into a IMDS 120 or related system through free text entry, entry in text fields, check boxes of pre-defined discounts, menus or any other means known in the art.

Following the negotiation of a rate, a customer 100 may be responsible for communicating details of the negotiated rate to a broker (step 205). A broker 105 may then load the rate information into an RT system (step 220). Data required by an RT system 115 may include all or a subset of the data entered into a IMDS 120 or any other data that might be required for an audit process. The means for loading the rate information may include a webpage or user interface form providing text fields for entering the name of the provider, the name of the provider representative, the negotiated rate, a confirmation number and the like. When rate information has been loaded into an RT system (step 225), it may immediately become eligible for an audit. In one embodiment, an RT system 115 may also serve as a services catalog, providing lookup services whereby customers 100 and/or brokers 105 may access, view and/or select services based on negotiated rates. In another embodiment, a broker 105 may utilize their own travel services management system to maintain provider data including rates. In this scenario, a broker 105 may facilitate loading rate data (step 230) into a travel services management system, or other database systems (step 230).

As used herein, a travel services management system, or management system, may include any software and/or hardware suitably configured to manage inventory related information. This may include, for example, available inventory, orders, pricing structures, rate data, discount data, promotional information, customer information and the like. A travel services management system may be a commercial system purchased through a third-party, a custom developed system or a combination thereof. While reference is made herein to a travel services management system, practitioners will appreciate that a similar system may be employed to manage any number of various services and/or products such as, for example, and inventory management system for a furniture supplier.

Practitioners will appreciate that there a number of commercial management systems which provide broker tools and views to maintain travel services information including details regarding providers 160 and rate information. When rate data has been loaded into any travel services management system (step 235), it may be available to a broker 105 to search for providers 160 and rates in order to provide their customers 100 with travel services tailored to the their travel plans and budget. While not illustrated, an RT system 115 may be configured to facilitate obtaining rate data directly from a travel services management system, thereby eliminating the need to enter rate data into an RT system 115 in addition to a travel services management system.

FIG. 3 is a flow chart illustrating an exemplary method for scheduling a rate audit and for configuring audit parameters. As used in reference to FIG. 3, any entity connecting to and/or configuring an audit, which may include a customer 100, broker 105 or designated third party, will be referred to simply as "user". Moreover, while the invention may be described with respect to a customer, one skilled in the art will appreciate that a broker or other third party may also function as the customer. A user may connect to an RT system (step 300) through any means as previously discussed. The user may be prompted to enter authentication information (step 305) to validate the user's identity. Authentication information may include a user ID, password, biometric, access code or a combination thereof. Authentication information may be verified (step 310) by transmitting the information to an RT system 115 where it may be compared to registration data stored within an RT database 135. If the RT system 115 cannot verify the authentication data (step 315), the user may again be prompted to enter authentication data (step 305). If the authentication information is verified (step 315), then the user may be presented a webpage or interface where they may request an audit (step 320).

Those skilled in the are will appreciate that the steps of logging into an RT system 115 and requesting an audit (step 320) as described above, may be initiated by any designated third party. In addition, the steps as described in FIG. 3 may or may not be carried out by the same entity. For example, a customer 100 may log into the RT system 115 and request an audit. A second party such as a broker 105, may execute the process of configuring and scheduling the audit which may comprise steps 325 through 365. Further, a customer 100, broker 105, or any designated third party may request an audit via any means known in the art such as, for example, telephone, email, postal mail, and the like.

Upon requesting or receiving a request for an audit (step 320), the user may be prompted to configure audit parameters (step 325). Audit parameters may define the specifics of how an audit is to be conducted as well as variables specific to each IMDS, such as authentication data. Parameters may also include, for example, which IMDS' 120 to audit, whether to audit all entries relating to a broker 105, all entries relating to a customer 100, specific providers 160, specific service types, etc.

The user may then be prompted to select a date and time for the audit to be scheduled (step 330). In one embodiment, an audit may be invoked at the time of requesting an audit (step 320) thereby eliminating the need to select a date and time for an audit to take place (step 330). In still another embodiment, an RT system 115 may provide options whereby the user may invoke an audit on request (step 320), schedule an audit for a later date and time (step 330) or a combination thereof.

The user may then be prompted to select whether the audit request should be conducted on a reoccurring basis (step 335). If the user's selection indicates that an audit should be conducted on a reoccurring basis (step 340), then the user may be prompted to configure an audit interval pattern (step 345). For example, if a user selects to schedule an audit for the last day of each month, an audit would be performed on the 31st day in January and on the 28th day of February.

If the user indicated that one or more additional audits are to be scheduled and/or configured (step 350), then the user may be directed to step 320 (step 370) where they may request an additional audit. If there are no additional audit requests (step 350) then the user may be prompted to confirm a schedule along with configuration information relating to the one or more requested audits (step 355). If the user determines a mistake has been made in scheduling an audit or defining parameters, then the user may indicate that they do not confirm (step 360) and may be directed to step 320 (step 370) where they may repeat the steps as previously described. If the user does confirm an audit (step 360), then the audit request including schedule and parameters may be transmitted to an RT system (step 365). When an RT system 115 receives an audit request, it may store the schedule information along with audit parameters in an RT database 135 or, if the user selected to conduct one or more audits in real-time, an RT system 115 may invoke an RT program 130 to begin an audit process.

In another embodiment, an RT system 115 may provide a means for audit parameters to be saved, thus eliminating the need to reenter audit parameters every time an audit is ordered. Saved audits may be presented to a user in the form of a list or menu from which an audit may be selected or modified. Selecting a saved audit from a list or menu may automatically apply some or all of the parameters of the previously saved version to the new audit.

FIG. 4 is a flow chart illustrating an exemplary method for facilitating an automated audit of negotiated rates within one or more IMDS' 120. When an RT system 115 invokes an RT program 130 to facilitate a scheduled audit (step 400), the RT system 115 may initiate a connection with one or more IMDS' (step 402) to facilitate access to IMDS 120 data. Where more that one IMDS 120 is to be audited, an RT system 115 may run audits on each consecutively or in parallel. When connections are established between an RT system 115 and one or more IMDS 120, RT system middleware 145 may navigate through a series of IMDS 120 interfaces or webpages, enter authentication data, and other commands as requested or required by the IMDS 120 (step 404). For example, middleware 145 may receive a login page from a IMDS 120. Through pattern matching technology (also known as screen-scraping), middleware 145 may recognize that the IMDS 120 page is a login page. Middleware 145 may then enter a user ID and password combination as previously defined and stored with an RT system 115. Through a sequence of similar steps, middleware 145 may navigate IMDS 120 screens or webpages (step 404) as may be required.

RT program 130 may transmit a request for an inventory item from the RT system 115 (step 406) relating to an inventory item to be audited within one or more IMDS' 120. Based on the RT inventory item, the RT program 130 may transmit a request to an RT server 125 for audit parameters relating to an inventory item in the RT system (step 408). Audit parameters, as previously described, may include information regarding which IMDS 120 inventory items to audit, authentication data, middleware pattern sets and/or scripts, lists of providers 160 to audit, audit date ranges, products, services and any other related information. For example, if an audit configuration defines that only IMDS 120 entries relating to a single specified provider 160 are to be audited, then RT program 130 may request only those records relating to the specified provider 160. Audit parameters may include values from key data fields which may be used to extract IMDS 120 data or query individual records from an RT database 135 when data from the two systems are to be compared. In another embodiment, data may be stored within an inventory management system rather than within an RT system 115 therefore, an RT system 115 may establish a connection with the inventory management system and transmit a request for rate data.

Using the RT system 115 audit parameters relating to an inventory item to audit, RT middleware 145 may navigate the IMDS 120, as discussed above, in order to find the inventory item in the IMDS 120 (step 410) that corresponds to the RT system inventory item as captured in step 406. When the IMDS 120 inventory item is located, RT middleware 145 may capture the inventory item audit parameter in the IMDS 120 system (step 412). For example, an audit parameter may be a daily room rate for a hotel. An RT system 115 audit parameter representing a daily room rate should correspond to an IMDS 120 room rate parameter. First, determination may be made regarding whether or not an RT system 115 parameter exists within an IMDS (step 414). If a corresponding RT system 115 parameter does not also exist in the IMDS (step 416), then the discrepancy may be added to an audit report (step 438). Details regarding a discrepancy may include, for example, the identity of the IMDS 120, name of the customer 100, name of the broker 105, name of a provider 160, date and time, description of the discrepancy and the like.

Practitioners will appreciate that while a means for obtaining data from a IMDS 120 is described above, there are other methods known in the art for obtaining data from a system. For example, if an owner or manager of an IMDS 120 agrees to allow direct database access from an RT system 115, then certain steps in the above process may not be necessary. Instead, data could be obtained directly through the issuance of a SQL query. This may be a single step process where data returned as a result of the query could be processed within an RT system 115. Further, a IMDS 120 may obtain various types of data such as, for example, live data, historical data, real-time, batch, packet and any other data type known in the art.

If the RT program 130 determines that the parameter data exists within the IMDS (step 416), then an RT program 130 may compare the inventory item's RT system 115 audit parameter to the IMDS 120 inventory item parameter (step 418). The system may identify data currencies and perform any desired currency conversions. The manner by which the two sources of data may be compared and which specific fields of data to compare may be extracted from audit parameters that have been previously defined. Any discrepancies found between the two data sources (step 420) may be detailed and added to an audit report (step 438).

Following the steps of comparing a IMDS 120 inventory item parameter to an RT system 115 audit parameter, determination may be made on whether there are additional RT system 115 inventory item audit parameters to verify (step 422). If the previous RT system inventory item audit parameters was not the final parameter for the inventory item (step 424), then the steps as outlined above may be repeated, comparing the next RT system 115 inventory item audit parameter against the next IMDS 120 inventory item audit parameter beginning at step 408 (step 434). If it RT program 130 determines that the previous inventory item audit parameter was the final parameter for the inventory item (step 424), then the RT program 130 may determine whether there are additional RT inventory items to be audited (step 426). If the previous RT system inventory item was not the last inventory item (step 428), then the steps as outlined above may be repeated starting at step 406 (step 436) where the next inventory item to be audited is extracted from an RT system 115. However, if the previous RT system 115 inventory item was the last inventory item (step 428) then the audit process may be complete and the RT program 130 may invoke a report generator 140 to compile an audit report (step 430).

An audit report may outline any discrepancies found during the audit along with sufficient detail to enable a customer 100, broker 105 or a third-party service provider to take appropriate actions to correct the discrepancies. Additionally, a report generator 140 may calculate statistics and add specific recommendations to the report corresponding to each the type of discrepancy reported. After an audit report has been compiled, an RT system 115 may transmit the report to the appropriate customer 100, broker 105 or third-party service provider (step 432) through email, a webpage, postal mail and/or the like. The system may also automatically correct any discrepancies through, for example, a dispute resolution process or an approval process from the customer 100 provider 105, third-party service provider or IMDS 120. The system may also include audits of loyalty point information or any other travel related service data.

An RT system 115 may additionally provide users with a system and/or method to obtain online help. Online help may be implemented through one or more frequently asked questions webpages where a user may view answers to commonly asked questions. Online help may also include an online form where a user may enter problems, questions, suggestions, etc. and submit the entry to an RT system 115. Answers and/or responses based on a user's submission may be delivered to a user by any means known in the art including email, a webpage, telephone response, postal mail, etc. An RT system 115 may also employ live help to assist users in real-time. Live help may provide a means for a user to submit specific questions, problems and/or concerns to a live customer support representative and receive a response in real-time. Live help may be facilitated through a chat-like environment similar to those offered my MSN Messenger and Yahoo! Messenger. Live help may also employ computing logic to decipher information submitted by a user and respond based on a pre-defined response which may be stored within an RT system 115.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A computer-implemented method to facilitate auditing of data in a database, the method comprising:
   entering first data into a first database;
   entering second data into at least one second database;
   creating an audit configuration including at least one audit parameter and an audit schedule,
      wherein the audit schedule indicates whether the audit is to be executed immediately upon the creating of the audit configuration or is to be executed at at least one predetermined date and time subsequent to the creating of the audit configuration, and
      wherein the audit schedule indicates whether the audit is a one-time audit or a recurring audit;
   executing the audit based at least in part on the audit configuration, wherein the executing of the audit includes:
      receiving screen data for navigating to a location of the first data,
      issuing a command for navigating to the location of the first data based on the screen data, and
      comparing the first data and the second data to determine if the first data and the second data are substantially similar prior to an authorization for a transaction.

2. The method of claim 1, wherein the first data includes rate data.

3. The method of claim 1, wherein the at least one second database includes at least one inventory management and distribution systems (TMDS) database.

4. The method of claim 1, wherein the comparing step includes obtaining the second data from the at least one second database.

5. The method of claim 1, wherein the comparing step includes obtaining the second data from the at least one second database using at least one of: a Structured Query Language (SQL) query, a screen scraping, and a pattern recognition.

6. The method of claim 1, further comprising at least one of: recording and reporting at least one discrepancy resulting from the comparing step.

7. The method of claim 1, further comprising negotiating a rate related to travel related services.

8. The method of claim 1, wherein the step of entering first data into a first database is facilitated by a broker.

9. The method of claim 1, wherein the step of entering second data into at least one second database is facilitated by a service provider.

10. The method of claim 1, further comprising converting currency to a common currency type.

11. The method of claim 1, further comprising matching a pattern included in the screen data to a predefined pattern.

12. A computer-implemented method to facilitate auditing of rate data in a database, the method comprising:
   entering first rate data into a first database;
   entering second rate data into a at least one second database;
   creating an audit configuration including at least one audit parameter and an audit schedule,
      wherein the audit schedule indicates whether the audit is to be executed immediately upon the creating of the audit configuration or is to be executed at at least one predetermined date and time subsequent to the creating of the audit configuration, and
      wherein the audit schedule indicates whether the audit is a one-time audit or a recurring audit;
   executing the audit based at least in part on the audit configuration, wherein the executing of the audit includes:
      receiving screen data for navigating to a location of the first rate data;
      issuing a command for navigating to the location of the first rate data based on the screen data; and
      comparing the first rate data and the second rate data to determine if the first rate data and the second rate data are substantially similar prior to an authorization for a transaction.

13. The method of claim 12, wherein the at least one second database includes an inventory management and distribution systems (IMDS) database.

14. The method of claim 12, further comprising matching a pattern included in the screen data to a predefined.

15. A system configured to facilitate auditing of data in a database, the system comprising:
   a first database having first data;
   at least one second database having second data; and
   a rate tracking (RT) server configured to:
      facilitate creating an audit configuration including at least one audit parameter and an audit schedule,
         wherein the audit schedule indicates whether the audit is to be executed immediately upon the creating of the audit configuration or is to be executed at at least one predetermined date and time subsequent to the creating of the audit configuration, and
         wherein the audit schedule indicates whether the audit is a one-time audit or a recurring audit; and
      execute the audit based at least in part on the audit configuration, wherein execution of the audit includes:
      receiving screen data for navigating to a location of the first data,
      issuing a command for navigating to the location of the first data based on the screen data, and
      comparing the first data and the second data to determine if the first data and the second data are substantially similar prior to an authorization for a transaction.

16. The system of claim 15, wherein the RT server is configured to match a pattern included in the screen data to a predefined pattern.

* * * * *